P. W. HAMILTON.
COOKING UTENSIL.
APPLICATION FILED MAR. 7, 1911.
1,023,645.
Patented Apr. 16, 1912.
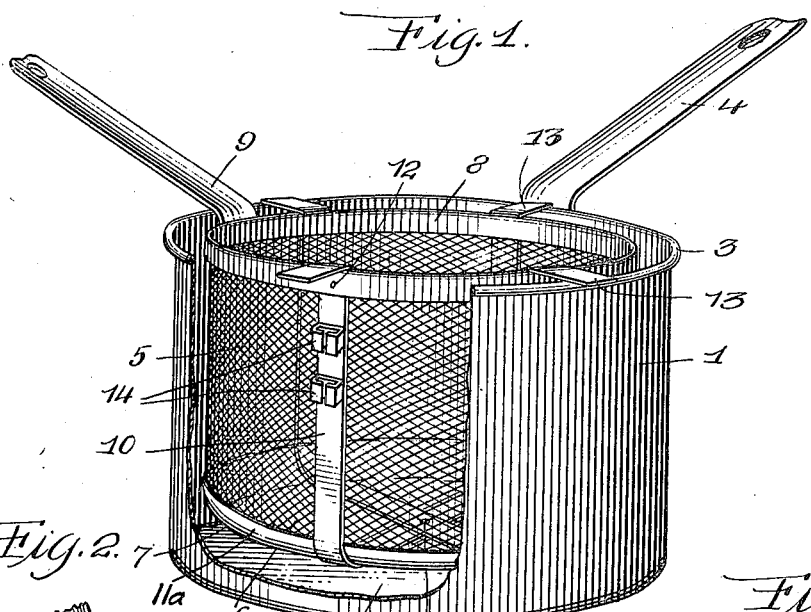
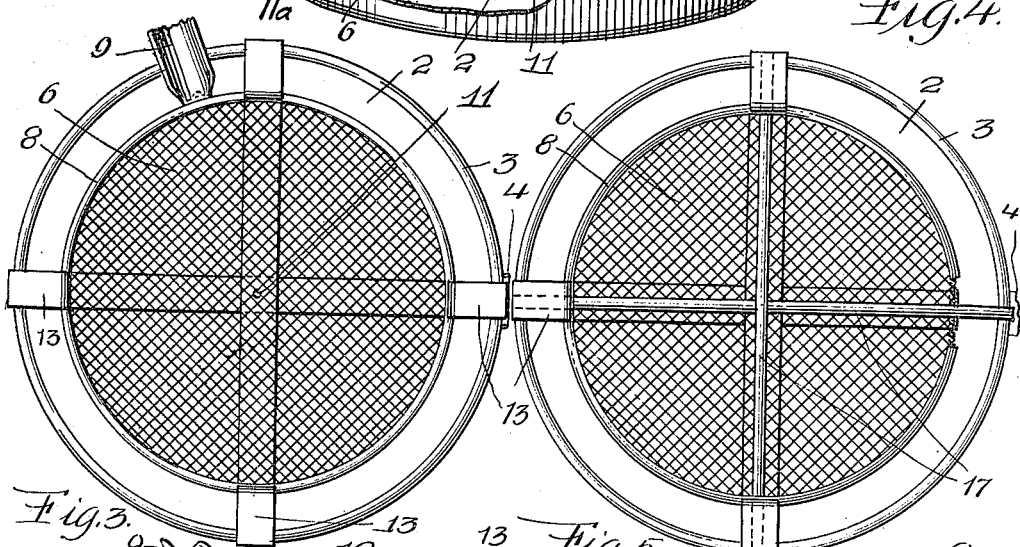
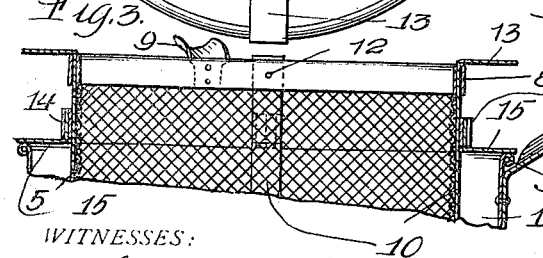
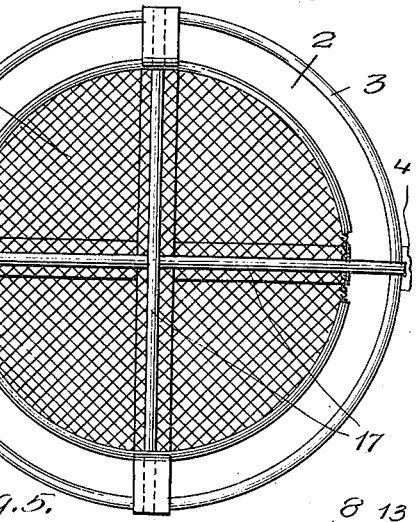
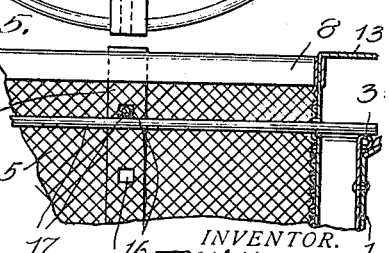
WITNESSES:
INVENTOR.
P. W. Hamilton.
BY
ATTORNEYS.

UNITED STATES PATENT OFFICE.

PINCKNEY W. HAMILTON, OF PITTSBURGH, PENNSYLVANIA.

COOKING UTENSIL.

1,023,645.  Specification of Letters Patent.  Patented Apr. 16, 1912.

Application filed March 7, 1911. Serial No. 612,914.

*To all whom it may concern:*

Be it known that I, PINCKNEY W. HAMILTON, a citizen of the United States of America, residing at Pittsburgh, in the county of Allegheny and State of Pennsylvania, have invented certain new and useful Improvements in Cooking Utensils, of which the following is a specification, reference being had therein to the accompanying drawing.

This invention relates to cooking utensils, and the primary object of my invention is to provide a stewing pan or receptacle that can be advantageously used in the preparation of various kinds of food, the pan being constructed to prevent food from burning and to insure an even and thorough cooking of the food.

Another object of the invention is to provide a stewing pan with an adjustable attachment that can be used for various purposes in the preparation of various kinds of food.

A further object of this invention is to accomplish the above results by a mechanical construction that is simple, free from injury by ordinary use, inexpensive to manufacture, and highly efficient for the purposes for which it is intended.

With the above and other objects in view the invention resides in a novel construction, combination and arrangement of parts to be hereinafter specifically described and then claimed.

Reference will now be had to the drawing wherein like numerals of reference designate corresponding parts throughout the several views, in which:—

Figure 1 is a perspective view of the cooking utensil partly broken away and partly in section, Fig. 2 is a plan of the same, Fig. 3 is a vertical sectional view of a portion of the utensil, Fig. 4 is a plan of a modified form of the utensil, and Fig. 5 is a vertical sectional view of a portion of the same.

The reference numeral 1 denotes a pan or receptacle having a flat bottom 2 and the upper edges thereof provided with a rim 3. The pan or receptacle has a handle or bail 4.

5 denotes a basket or cage, preferably made of strong and durable wire gauze, but in lieu of the wire gauze a foraminous body can be used. The basket 5 is of a less depth and diameter than the receptacle 1 and has a flat bottom 6 with rounded lower edges 7. The upper edges of the basket are reinforced by a hoop or ring 8 to which is suitably attached a handle or bail 9. The basket 5 is reinforced by U-shaped straps 10 arranged upon the bottom and outer sides of said basket, the straps 10 crossing one another at the bottom of the basket, and connected by a rivet or other fastening means 11. The lower edges of the basket are reinforced by another hoop 11ª, whereby the edges of the basket cannot be indented or otherwise injured, said hoop being suitably connected to the basket. The upper ends of the straps 10 suitably connected, as at 12 to the hoop 8 and the ends of the straps are bent outwardly to provide brackets 13 adapted to rest upon the upper edges 3 of the receptacle 1 and support the basket 5 centrally of said receptacle and in a raised position relatively to the bottom 2 of said receptacle.

Suitably connected to the outer sides of the straps 10, adjacent to the hoop 8 are superimposed channel shaped holders 14 and adapted to be detachably mounted in these holders are angle brackets 15 also adapted to rest upon the upper edges of the receptacle 1, when it is desired to support the basket 5 at a greater elevation than is capable by the brackets 13.

A modification of the invention is shown in Figs. 4 and 5 of the drawings, wherein the holders 14 are dispensed with and the straps 10 and the basket 5 are provided with diametrically opposed apertures 16 to receive rods 17, the ends of said rods supporting the basket upon the upper edges of the receptacle 1.

From the foregoing it will be observed that I have devised an attachment for a cooking utensil that can be positioned in the receptacle for preparing various kinds of food, the flat bottom of the basket insuring an even and thorough cooking of the matter contained within the basket, also preventing the matter from contacting with the sides of the receptacle and burning. The basket can be used for steaming purposes when placed in an elevated position within the receptacle and with a small quantity of water boiling in the bottom of the receptacle. It permits of two kinds of food being prepared within the receptacle without commingling and facilitates the draining of any food prepared therein.

The labor of cooking is minimized and since the possibility of scorching or burning food in the pan or boiler is eliminated, such vegetables as potatoes, rice, spaghetti can be advantageously cooked, while eggs, string beans, corn and other matter can be boiled. Even though the water should boil dry and the receptacle is injured, it is impossible for the food to taste of any part of the burned receptacle. The very fact that water can be drained from the boiled food eliminates all danger of the hands being burned by steam or by contacting with the food.

I reserve the right to make the inner receptacle or basket with solid walls, whereby a double boiler will be provided for the preparation of various kinds of foods.

While in the drawings there are illustrated the preferred embodiments of the invention, it is to be understood that the structural elements thereof can be changed, as to the size, shape, material and manner of assemblage, without departing from the scope of the appended claim.

What I claim is:—

In combination, a receptacle, a foraminous basket, a series of reinforcing straps secured to the bottom of said basket and having vertically disposed portions terminating in lateral projections at the top of the basket to engage the top edge of the receptacle for suspending the basket above the bottom of the receptacle and with its top edge substantially in alinement with the top edge of said receptacle, channel shaped holders formed in spaced relation to each other upon the outer face of the vertical portions of each of said straps and arranged below said lateral projections, angle brackets capable of extending in and projecting from said holders for engaging with the upper edge of the receptacle for adjustably supporting said basket in an elevated position with respect to the receptacle, and a handle carried by the basket.

In testimony whereof I affix my signature in the presence of two witnesses.

PINCKNEY W. HAMILTON.

Witnesses:
 MAX H. SROLOVITZ,
 CHRISTINA T. HOOD.